(12) United States Patent
Kroack et al.

(10) Patent No.: US 9,707,827 B2
(45) Date of Patent: Jul. 18, 2017

(54) WINDOW LIFTER ASSEMBLY WITH DIFFERENT FIXING POINTS FOR A GUIDE RAIL

(71) Applicant: Brose Fahrzeugteile GmbH & Co. Kommanditgesellschaft, Hallstadt, Hallstadt (DE)

(72) Inventors: Rainer Kroack, Breitengueßbach (DE); Frank Wagner, Nürnberg (DE); Klaus Hampel, Coburg (DE); Carsten Haering, Ahorn (DE); Philipp Barthelmann, Pfarrweisach (DE); Heike Wolf, Bamberg (DE)

(73) Assignee: Brose Fahrzeugteile GmbH & Co. Kommanitgesellschaft, Hallstadt, Hallstadt (DE)

( * ) Notice: Subject to any disclaimer, the term of this patent is extended or adjusted under 35 U.S.C. 154(b) by 0 days.

(21) Appl. No.: 14/812,883

(22) Filed: Jul. 29, 2015

(65) Prior Publication Data

US 2016/0039272 A1 Feb. 11, 2016

(30) Foreign Application Priority Data

Aug. 6, 2014 (DE) .................. 10 2014 215 608

(51) Int. Cl.
*B60J 5/04* (2006.01)
*B60J 1/00* (2006.01)
(Continued)

(52) U.S. Cl.
CPC ............. *B60J 1/004* (2013.01); *E05F 11/382* (2013.01); *F16B 5/07* (2013.01); *E05Y 2600/56* (2013.01)

(58) Field of Classification Search
CPC . B60J 1/004; E05F 11/382; F16B 5/07; E05Y 2600/56
(Continued)

(56) References Cited

U.S. PATENT DOCUMENTS 4,685,248 A * 8/1987 Hammond ............ E05F 11/426
49/349
6,758,013 B2 * 7/2004 Staser ................... E05F 11/382
16/90

(Continued)

FOREIGN PATENT DOCUMENTS

CN 1665693 A 9/2005
CN 201013164 Y 1/2008
(Continued)

OTHER PUBLICATIONS

CN Search Report (English translation), dated Sep. 9, 2016, issued in corresponding Chinese Application No. 201510477276.3, 2 pages.
(Continued)

*Primary Examiner* — Jerry Redman
(74) *Attorney, Agent, or Firm* — Lewis Roca Rothgerber Christie LLP (57) ABSTRACT

A window lifter assembly is provided which comprises at least one carrier component and a guide rail fixed at the carrier component, which defines a path of adjustment for a window pane to be adjusted. At least three geometrically differently designed first, second and third fixing regions are provided at the guide rail, which in the properly connected state with a tab each engage into a cutout of an associated fixing region at the carrier component. Identically formed screws are used at the different first, second and third fixing points defined thereby, in order to fix the guide rail at the carrier component.

20 Claims, 5 Drawing Sheets

(51) Int. Cl.
*F16B 5/07* (2006.01)
*E05F 11/38* (2006.01)

(58) Field of Classification Search
USPC .......................... 49/348, 349, 350, 351, 352
See application file for complete search history.

(56) References Cited

U.S. PATENT DOCUMENTS

| | | | | |
|---|---|---|---|---|
| 6,910,730 | B2* | 6/2005 | Kinoshita | B60J 1/1861 |
| | | | | 296/146.16 |
| 8,065,837 | B2* | 11/2011 | Nakajima | B60J 5/0416 |
| | | | | 49/352 |
| 8,839,566 | B2* | 9/2014 | Deschner | B60J 5/0416 |
| | | | | 49/348 |
| 2006/0101720 | A1 | 5/2006 | Zimmerman et al. | |
| 2007/0251149 | A1* | 11/2007 | Kirejczyk | E05F 11/483 |
| | | | | 49/352 |
| 2013/0097932 | A1 | 4/2013 | Kriese et al. | |
| 2013/0121789 | A1 | 5/2013 | Hendrix et al. | |
| 2013/0219794 | A1* | 8/2013 | Nakamura | E05F 11/426 |
| | | | | 49/350 |
| 2014/0152036 | A1 | 6/2014 | Karl et al. | |
| 2014/0237900 | A1* | 8/2014 | Imaoka | E05F 11/486 |
| | | | | 49/352 |

FOREIGN PATENT DOCUMENTS

| | | |
|---|---|---|
| CN | 202672950 U | 1/2013 |
| CN | 202955076 U | 5/2013 |
| DE | 41 40 574 A1 | 6/1993 |
| DE | 10 2010 031 013 A1 | 1/2012 |
| DE | 20 2011 103 327 U1 | 12/2012 |

OTHER PUBLICATIONS

CN First Office action dated Sep. 20, 2016, issued in corresponding Chinese Application No. 201510477276.3, 6 pages.
English translation of CN First Office action dated Sep. 20, 2016, 3 pages.

* cited by examiner

FIG 9C

WINDOW LIFTER ASSEMBLY WITH DIFFERENT FIXING POINTS FOR A GUIDE RAIL

CROSS-REFERENCE TO RELATED APPLICATION

This application claims priority to German Patent Application No. 10 2014 215 608.4 filed on Aug. 6, 2014, the entirety of which is incorporated by reference herein.

BACKGROUND

The present invention relates to a window lifter assembly and to a method for mounting such window lifter assembly.

A generic window lifter assembly includes at least one carrier component, for example in the form of a door module or assembly carrier, and at least one guide rail fixed at the carrier component, which defines a path of adjustment for a window pane to be adjusted. The guide rail usually made of metal is fixed at the carrier component usually made of plastics at several fixing points via at least one fixing element each, for example in the form of rivets, bolts or screws. To improve the assembly and the proper fixation of the guide rail at the carrier component, it is known to each form fixing regions adjusted to each other both on the guide rail and on the carrier component. For this purpose, a fixing region with a screw boss and a conical or frustoconical cutout for example is defined on the carrier component. In the state connected with the carrier component, a fixing region with a conical or frustoconical tab and a through opening furthermore is provided on the guide rail, wherein the tab then engages into an associated cutout of the carrier component. A fixing element is guided through the respective through opening of the tab and presses at least one clamping surface of the tab in direction of a clamping surface of the cutout, in order to properly fix the guide rail at the respective fixing point on the carrier component.

From DE 20 2011 103 327 U1 for example a window lifter assembly is known, in which a guide rail engages into correspondingly formed conical cutouts on a carrier component via several conical tabs and in the process is fixed by rivets at the fixing points defined thereby. A first, upper pair of fixing points serves the fixation in all three directions in space extending vertically to each other, while a second, lower pair of fixing points each is provided for a tolerance compensation in a direction in space, here the z-direction, along which a window pane is to be adjusted. However, the riveting process regularly can be automated only with difficulty. In addition, for transmitting the occurring forces two rivet connections are necessary at each fixing point, wherein the quality of the rivet connections regularly can be controlled only with comparatively great expenditure.

From DE 41 40 574 A1 a window lifter assembly furthermore is known, in which a screw connection is provided for fixing a door module carrier made of sheet steel at a door inner panel. Via the screw connection a first fixing point for the relative positioning of the parts to be connected is defined in all three directions in space extending vertically to each other, wherein fittable frustoconical embossments engage in each other and a screw can be screwed into a welding nut of the door inner panel. A second fixing point differs from the first fixing point by the fact that the frustoconical embossment in the door inner panel is formed oblong and trough-like for the purpose of tolerance compensation and instead of a round through opening for a screw includes an oblong hole. With such different first and second fixing points it is particularly disadvantageous, however, that precisely setting the welding nuts in the door inner panel involves a comparatively high manufacturing and assembly effort.

From DE 10 2010 031 013 A1 a window lifter assembly furthermore is known, in which a guide rail between end-side fixing points includes at least one further fixing point in a y-direction transversely to the door plane.

SUMMARY

It is an object underlying the invention to further improve a window lifter assembly as mentioned above, in particular with regard to an improved and more easily automatable assembly of a guide rail on a carrier component of the window lifter assembly.

This object is solved both with the window lifter assembly as described herein and with the assembly method as described herein.

According to the invention, it is provided that at least three geometrically differently designed first, second and third fixing regions are provided on the guide rail, which in the properly connected state each engage into a conical or frustoconical cutout of an associated fixing region on the carrier component with a conical or frustoconical tab. Despite the geometrically differently designed first, second and third fixing regions, identically formed screws are used at different first, second and third fixing points defined thereby, in order to properly fix the guide rail at the carrier component. Due to the different geometry of the fixing regions of the guide rail, the identical screws fix the guide rail

- at the first fixing point along three directions in space vertical to each other,
- at the second fixing point only along two directions in space vertical to each other, and
- at the third fixing point only along one direction in space.

Despite the use of identical screws, it thus is achieved at the at least three different fixing points that the guide rail is fixed with different degrees of freedom. When fixing at the first fixing point is effected in x-, y- and z-direction, the guide rail is fixed at the second fixing point merely in x- and y-direction and at the third fixing point only in y-direction.

By using identically formed screws, for example with likewise conical or frustoconical screw head, the amount of identical parts is increased, whereby the assembly process is simplified and can be carried out at lower cost. In addition, by providing screw connections at all fixing points, the assembly process also is automatable more easily. Due to the solution according to the invention with its geometrically differently designed fixing regions it is ensured that the guide rail always is fixed at the carrier component in the desired way and in particular in a specified relative position with respect to the carrier component.

In one design variant, the third fixing point at which fixing of the guide rail at the carrier component is effected only along one direction in space is provided relative to a direction of longitudinal extension of the guide rail between the first and the second fixing point. The fixing point for example also can be located approximately centrally between the first and the second fixing point. In this way, the guide rail for example first is fixed in the region of a first (based on a future arrangement within a vehicle) upper end of the guide rail at the first fixing point. Subsequently, fixing is effected in the region of the opposite (lower) end at the second fixing point, before subsequently fixing is effected on the carrier component at the third fixing point which is located between the two first and second fixing points.

In principle, the first fixing region of the guide rail can include a conical or frustoconical tab which with a precise fit engages into the associated cutout of the (first) fixing region on the carrier component. When turning the screw into the carrier component, the guide rail here thus is fixed at the carrier component along all three directions in space vertical to each other.

A fixing region on the carrier component in principle can include a screw boss with a prefabricated screw channel for the screw to be turned in. Alternatively, a screw boss has no prefabricated screw channel and the screws employed are of the self-tapping type.

In one design variant, the third fixing region provided for the definition of the third fixing point on the guide rail is formed such that in an unconnected state of the guide rail, in which no screw has been turned in yet, it
   does not form a conical or frustoconical tab, or
   at best forms an incompletely formed conical or frustoconical tab which only extends along a part of that length in direction of the cutout of the carrier component, with which the tab engages into this cutout after turning in the associated screw.

Hence, in this design variant the third fixing region has no or only a slightly conical or frustoconical preforming, so that the tab of the third fixing point, which in the properly connected state engages into the cutout, only is formed by turning in the screw or at least only is formed to the required extent. The dimensions of the preforming of the fixing region can be chosen such that they correspond to the expected maximum tolerances for the guide rail along the directions in space (x- and z-direction), which are vertical to a direction of mounting the guide rail on the carrier component. During assembly of the guide rail onto the carrier component, a preformed tab of the third fixing region thus in any case still permits a change in position within the admissible tolerances and in particular along those directions in space along which no fixation of the guide rail is effected at the third fixing point.

To support a—possibly stronger—formation of the tab when turning in the screw at the third fixing point, the third fixing region in one development forms at least one tab-like deformation region at an edge of its through opening, which is deformable, preferably plastically deformable by turning in the associated screw in direction of the carrier component. Consequently, there is provided at least one defined region at the edge of the through opening, which is deformed by turning in the screw and is pressed in direction of an inner surface of the associated cutout on the carrier component.

A tab-like deformation region can be defined by at least two slots spatially spaced from each other in the fixing region of the guide rail. These slots extend substantially radially to a screw axis of the screw guided through the through opening of the associated third fixing region. In a development based thereon, several (at least two) tab-like deformation regions also can be formed in the fixing region.

In one design variant, the edge of the through opening is divided into several segments of substantially equal size by several slots each extending substantially radially to the screw axis, which each define a tab-like deformation region. The individual segments here can uniformly be arranged around the through opening. For example, there are provided six to eight segments at the edge of the through opening of the third fixing region of the guide rail. By providing a plurality of tab-like deformation regions, the same can be deformed more easily not only each on turning in of the associated screw. Rather, this also provides for an improved tolerance compensation along the two directions in space, along which at the third fixing point no fixation of the guide rail at the carrier component is effected. The different deformation regions thus can be deformed and bent through to a different extent and in particular at different points, when the screw is turned in, depending on how during the previous insertion of the screws at the first and second fixing points the guide rail has oriented itself with respect to the carrier component within the admissible tolerances. It thereby is permitted that a middle axis of the through opening at the third fixing region of the guide rail does not coincide with the screw axis. By action of a screw head of the screw onto the individual tab-like deformation regions, the same thus can be bent differently in direction of the (cone) inner surfaces of the cutout of the carrier component. The diameter of a through opening at the third fixing point also deliberately is chosen larger than the diameter of a thread portion of the screw. For example, the through opening maximally can correspond to the diameter of the thread portion of the screw plus twice a specified tolerance value or a permitted tolerance deviation in one of the directions in space, along which the guide rail is not fixed with respect to the carrier component at the third fixing point. By turning in the screw at the third fixing point, the tolerance deviation to be expected thereby can be compensated in any case.

Proceeding from this fundamental idea, another measure is chosen as relevant in one design variant, in order to achieve the effect described above. Here, an enveloping circle diameter around the screw axis is chosen for the radially extending slots such that the same substantially corresponds to the sum resulting from
   a maximum diameter of an upper edge of the conical or frustoconical cutout facing the guide rail at the associated fixing region of the carrier component, and
   twice a specified tolerance value for the guide rail in one of the directions in space, along which the guide rail is not fixed at the third fixing point with respect to the carrier component.

In this way it is ensured that the segments defined by the slots with their tab-like deformation regions provide for a sufficient shift in tolerance when the screw head of the screw acts on all tab-like deformation regions.

In one exemplary embodiment it is provided alternatively or in addition that the second fixing region provided for the definition of the second fixing point on the guide rail includes an oblong-hole-shaped through opening. By this oblong-hole-shaped through opening it is achieved that the guide rail receives a degree of freedom at the second fixing point along a direction in space.

Against this background, the fixing region provided for the definition of the second fixing point at the carrier component also can define a conical or frustoconical cutout which is designed oblong in a direction in space transversely to the screw axis of the screw to be turned in there. In that this oblong cutout at the carrier component then is designed larger, in particular longer than the conical or frustoconical tab of the guide rail engaging therein—and possibly likewise designed oblong —, an alignability of the guide rail preferably along its longitudinal extension and hence along a certain direction in space is given in a simple way. At the second fixing point a tolerance compensation along this one direction in space thus is possible during assembly of the guide rail, without having to utilize a different fixing element.

In one exemplary embodiment at least one further, fourth fixing point can be provided in addition to the at least first, second and third fixing points, for whose definition a further fixing region is formed at the guide rail. With regard to its geometry, the same preferably substantially corresponds to the geometry of the third fixing region. In such a variant, two third fixing regions and two third fixing points consequently are provided for the guide rail. The additional fixing point for example is located in the region of the second fixing point. Via this additional fixing point the guide rail is fixed at the carrier component, before turning in of the screw is effected at the third fixing point, arranged for example centrally between the first and second fixing points.

In one exemplary embodiment, the fixing regions provided on the carrier component for the definition of the first and third fixing points are formed substantially identical in terms of their geometry. For example, in particular the screw bosses formed on the carrier component at the respective first and third fixing regions are designed geometrically identical. Due to the geometrically differently designed fixing regions on the guide rail, however, different degrees of freedom then nevertheless are achieved for the guide rail at the first and third fixing points by utilizing identical screws.

In one exemplary embodiment, the identical screws which are used at the first, second and third fixing points each have a frustoconical screw head with a trapezoidal cross-section. Such screw head thus forms a conical shell surface on an outside and a flat screw head bottom side. Via the conical shell surface, centering of the guide rail can be effected. Via the flat screw head bottom side a clamping connection furthermore can be achieved, without centering of the guide rail being effected (by providing a sufficient clearance in the region of the conical shell surface).

In a design variant in which screws with a frustoconical screw head are used, it can be provided that the cutouts of the fixing regions provided for the definition of the first and second fixing points at the carrier component and the tabs engaging therein of the first and second fixing regions provided at the guide rail each likewise are frustoconical, so that two flat base surfaces of a cutout and of a tab, which are arranged one above the other, each face a flat bottom side of the frustoconical screw head, and in the properly connected state a clearance is present between the bottom side of the screw head and the base surface of the guide rail and/or between the base surfaces of the carrier component and the guide rail. Consequently, in the properly connected state a space is provided here between the flat bottom side of the screw head and the flat base surface of the guide rail and/or between the flat base surfaces of the carrier component and the guide rail, so that via the conically tapered lateral shell surfaces of its screw head the screw in any case acts on the conically extending or funnel-shaped (cone) inner surfaces of the tab and clampingly urges the opposed (cone) outer surfaces against the likewise conically extending or funnel-shaped (cone) inner surfaces of the associated cutout. At the first and second fixing point it thus is ensured that here the desired fixation of the guide rail relative to the carrier component is effected in three directions in space vertical to each other or in two directions in space vertical to each other and the portions of the tab are pressed against the conically extending or funnel-shaped side or inner surfaces of the cutout with sufficient force by the screw turned in.

The cutout of the fixing region provided for the definition of the third fixing point at the carrier component likewise can be frustoconical, so that when using a screw with frustoconical screw head a flat base surface of the cutout faces a flat bottom side of this screw head, and in the properly connected state the screw with its bottom side clamps a portion of the tab of the guide rail against the flat base surface of the carrier component at the third fixing point. Consequently, the third fixing region on the guide rail here is formed such and adjusted to the associated fixing region of the carrier component such that the screw with its screw head trapezoidal in cross-section exerts a clamping force (exclusively) via its flat bottom side. In the properly connected state
- a clearance between a conically tapered outer shell surface of the screw head and the adjacent conically extending (cone) inner surfaces of the tab of the guide rail and/or
- a clearance between the portions of the guide rail and of the carrier component facing each other and each extending conically is permitted and selectively provided, so that at the third fixing point no centering is effected via the screw turned in.

In one variant, in the properly connected state both a clearance between the lateral shell surface of the screw head and the (cone) inner surface of the tab and a clearance between the (cone) outer surface of the tab and the (cone) inner surface of the cutout is provided at the third fixing point.

For arranging and holding the guide rail in a defined preassembly position at the carrier component, before the screws are turned in at the fixing points, the carrier component and the guide rail in one exemplary embodiment each include preassembly means. Via these preassembly means cooperating with each other, the guide rail is arranged and held on the carrier component in the preassembly position via at least one positive connection before turning in the screws. For example, the preassembly means of the guide rail comprises a preassembly opening and a preassembly means of the carrier component comprises a protruding preassembly portion which in the preassembly position positively engages into the preassembly opening. The preassembly portion for example can be formed by a web protruding like a rib. Instead of a protruding web, a protruding portion geometrically designed in some other way can of course also be provided, in particular be formed, on the carrier component, for example a pin.

Alternatively or in addition, the guide rail can form a protruding preassembly portion, for example in the form of a web or pin, and the carrier component can form an assembly opening for this preassembly portion of the guide rail.

To more strongly secure the guide rail and the carrier component at each other via a protruding preassembly portion engaging into an assembly opening and to captively hold the guide rail at the carrier component in the preassembly position, deformable clamping tabs can be provided at the edge of the preassembly opening. These deformable clamping tabs are bent over by the preassembly portion put through the preassembly opening and thereby non-positively and/or positively get caught with the preassembly portion, so that the guide rail no longer can easily be separated from the carrier component.

The assembly can be facilitated considerably by a window lifter assembly according to the invention, and in particular a proper fixation of at least one guide rail on a carrier component can be achieved and automated in a simple and particularly inexpensive way. Via the identical screws, the guide rail is fixed at the carrier component
first at the first fixing point along three directions in space vertical to each other, thereafter at the second fixing point only along two directions in space vertical to each other, and thereafter at the third and possibly a further third fixing point only along one direction in space.

Due to the provided different design of the fixing regions on the guide rail, which define the different fixing points, and due to the chosen sequence in use of the fixing points, so that fixing points are used one after the other, which each—with respect to the previously used fixing point—permit an additional degree of freedom for the guide rail, the guide rail at the end of the assembly process always is fixed at the carrier component in a desired relative position, without the guide rail having been braced to an undesired extend due to the fixation.

The window lifter assembly according to the invention and an associated assembly method were found to be particularly advantageous in a carrier component of a plastic material and a guide rail of a metallic material.

BRIEF DESCRIPTION OF THE DRAWINGS

Further advantages and features of the invention will become apparent from the following description of exemplary embodiments with reference to the Figures.

FIG. 3 shows a side view of a section of the carrier component with guide rail fixed thereto.

FIGS. 4A-4C show enlarged views of the first, second and third fixing points, each with screw turned in.

FIG. 5 shows an enlarged view of cooperating preassembly means of the guide rail and the carrier component according to FIG. 3.

FIGS. 8A-8B show sectional views along different sectional planes of the second fixing point.

FIGS. 9A-9B show sectional views of the third fixing point without and with screw turned in.

FIG. 9C shows an enlarged representation of the third fixing point with illustration of a possible tolerance compensation in z-direction, when the screw is turned in.

DETAILED DESCRIPTION

Figure 1:
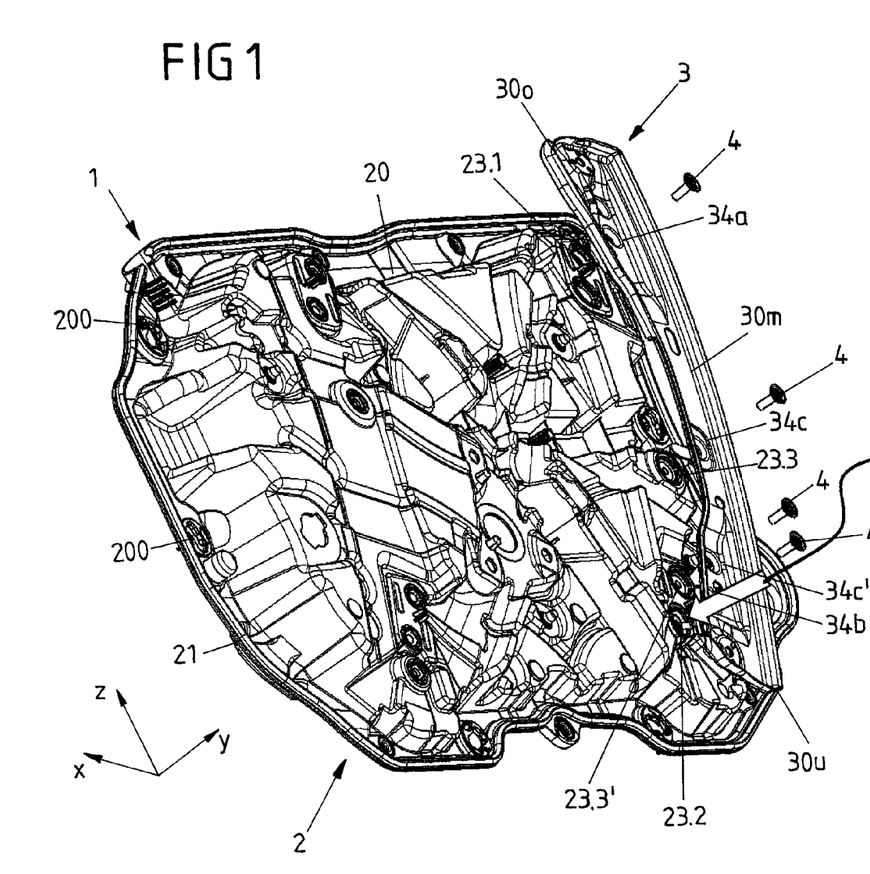
FIG. 1 shows an exploded representation of a design variant according to the invention of a window lifter assembly with a total of four fixing points for a guide rail on a carrier component, wherein three of the fixing points are defined by three geometrically differently designed fixing regions on the guide rail and for fixing the guide rail identically designed screws exclusively are provided.
Figure 2A:
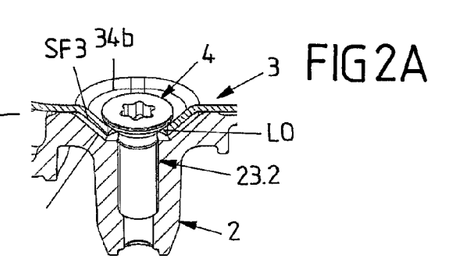
FIGS. 2A-2C show different views of a second fixing point and the fixing regions of the guide rail and the carrier component defining the same.
Figure 2B:
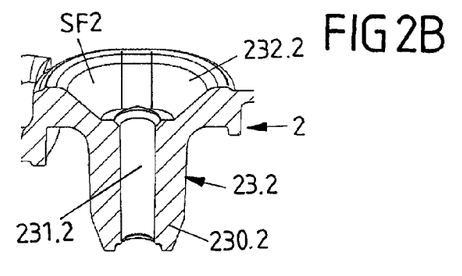
Figure 2C:
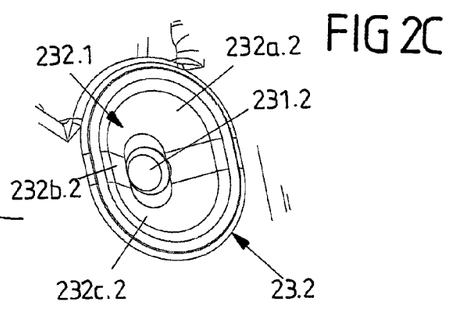

FIG. 1 shows an exploded representation of a window lifter assembly 1 according to the invention with a carrier component in the form of a flat assembly carrier 2 usually made of plastics and a guide rail 3 to be fixed thereto, which usually is made of a metallic material. The assembly carrier 2 defines a base surface 20, at whose edge a circumferential seal 21 is provided in a manner known per se. Beside the guide rail 3, further non-illustrated functional components can be fixed on the base surface 20, such as for example a further guide rail and a drive unit for a vehicle window lifter. Furthermore, the base surface 20 includes several connecting points 200 with through openings for fixing the assembly carrier 2 on a door inner panel. For example, the connecting points 200 which are arranged in the region of an edge of the base surface 20 each serve the fixation via a bayonet connection.

For fixing the guide rail 3 at the assembly carrier 2, the assembly carrier 2 includes several fixing regions 23.1, 23.2, 23.3 and 23.3'. Each of these fixing regions 23.1, 23.2, 23.3 and 23.3' includes a conical cutout 232.1, 232.2 or 232.3 on a side facing the guide rail 3, which opens into a screw channel 231.1, 231.2 or 231.3 in a screw boss 230.1, 230.2 or 230.3, wherein the screw boss 203.1, 230.2 or 230.3 each is formed on a side of the base surface 20 facing away from the guide rail 3 (cf. in particular also FIGS. 2A to 2C and 4A to 4C). In the present case, the fixing region 23.3' geometrically is formed substantially identical to the fixing region 23.3 of the assembly carrier 2, which defines a third fixing point for the guide rail 3.

In the present case, the guide rail 3 is properly connected with the assembly carrier 2 at a total of four fixing points. The four different fixing points are designated with A, B, C and C' corresponding to FIG. 3, in which a section of the window lifter assembly 1 with the guide rail 3 properly fixed at the assembly carrier 2 is shown in a side view. The guide rail 3 likewise forms fixing regions 34a, 34b, 34c and 34c', which at the fixing points A, B, C and C' cooperate with the associated fixing regions 23.1, 23.2, 23.3 and 23.3' of the assembly carrier 2, when the guide rail 3 is properly fixed at the assembly carrier 2. The fixing regions 34a, 34b and 34c/34c' are designed geometrically different from each other, in order to fix the guide rail 3 at the assembly carrier 2 with different degrees of freedom despite the use of identical screws 4 at the individual fixing points A, B, C and C'.

A first fixing region 34a for a first fixing point A is provided in an upper end region 30o of the guide rail 2 and serves the fixation of the guide rail 3 at the assembly carrier 2 along the three directions in space x, y and z extending vertical to each other.

The second fixing point B, at which during assembly the guide rail 3 is fixed at the assembly carrier 2 via a further screw 4 subsequent to the fixing point A, is defined by a second fixing region 34b in an opposite lower end region 30u of the guide rail 3. At this second fixing point B the guide rail 3 is fixed at the assembly carrier 2 merely in two directions in space x and y via the screw 4 turned in. At this fixing point B, the guide rail 3 has a degree of freedom along the z-direction along which the guide rail 3 extends in essence. The guide rail 3 thus is fixed at the second fixing point B in the direction in space x, which together with the direction in space z defines the xz-plane, in which the base surface 20 extends in essence, and in the direction in space y along which the screws 4 each are turned into the assembly carrier 2.

Subsequent to the fixation at the fixing point B a fixation of the guide rail 3 at the third fixing point C is effected in a middle region 30m of the guide rail 3. This third fixing point C is defined by a fixing region 34c of the guide rail 3 designed geometrically different with respect to the first and second fixing regions 34a and 34b. At this third fixing point C the guide rail is fixed only in the direction in space y.

The (optional) additional fixing point C' is utilized before or after fixing the guide rail 3 at the third fixing point C and is defined by the fixing region 34c' of the guide rail 3, which is formed identical to the third fixing region 34c.

The geometries of the individual fixing regions 34a, 34b and 34c/34c' will yet be explained in detail below. It is decisive, however, that due to the geometrically different fixing regions 34a, 34b and 34c/34c' and hence the different types of fixing points A, B and C/C' for the guide rail 3, the guide rail 3 can be fixed at the assembly carrier 2 with different degrees of freedom despite the use of identically formed screws 4. The guide rail 3 thereby can be fixed at the assembly carrier 2 free from distortion and always in a defined relative position in an automated assembly process, which due to the exclusive use of identical screws 4 can be realized particularly easily and at low cost. Independent of the representation in FIGS. 1 and 3, the fixing points A and B of course can also be reversed, so that the fixing point A is provided at a lower end and the fixing point B is provided at an upper end of the guide rail 3. Furthermore, it is not absolutely necessary that the third fixing point C is arranged between the two other fixing points A and B.

As is apparent in particular with the enlarged representations of FIGS. 2A to 2C, 4A to 4C, 6, 7, 8A to 8B and 9A to 9C, each fixing region 34a, 34b, 34c/34c' of the guide rail 3 in the state properly connected with the assembly carrier 2 forms a protruding tab engaging into the respectively associated cutout 23.1, 23.2, 23.3/23.3'. In the present case, this tab each is formed conical, so that conically extending side faces SF3 of a tab rest against conically extending sides or (cone) inner surfaces SF2 of the associated cutout 232.1, 232.2 or 232.3 or at least are arranged adjacent to the same, when the respective screw 4 is turned in properly. While the tab of the first fixing region 34a has a conical outer side face SF3 as clamping surface, which precisely fits with the cutout 232.1 and its side faces SF2, in order to achieve a fixation in all three directions in space x, y, z, the tabs of the fixing regions 34b and 34c/34c' are not designed with a precise fit with respect to the associated cutouts 232.2, 232.3 at the assembly carrier 2. Furthermore, the fixing region 23.2 of the second fixing point B at the assembly carrier 2 also is designed geometrically different from the fixing regions 23.1 and 23.3/23.3' of the first and both third fixing points A and C/C'.

The first, upper fixing point A in particular is defined by the first fixing region 34a of the guide rail 3. As can be taken from FIG. 4A and the sectional view of FIG. 7, the same forms a conical tab which in the connected state engages into the conical cutout 232.1 of the first fixing region 23.1 of the assembly carrier 2. The screw 4 turned into the screw channel 231.1 of the screw boss 230.1 urges the side face SF3 of the tab acting as clamping surface against the side face SF2 of the cutout 232.1 acting as counter clamping surface. The guide rail 3 here is fixed in all three directions in space x, y and z. In particular the sectional representation of FIG. 7 furthermore shows a reinforcing rib 22 which is provided for reinforcement of the fixing region 230.1 and annularly extends around the protruding screw boss 230.1.

Corresponding to the representations of FIGS. 2A to 2C, 4B and 8A to 8B it is provided at the second, lower fixing point B that the second fixing region 23.2 of the assembly carrier 2 is lengthened in z-direction. The conical cutout 232.1 correspondingly includes two opposed cone portions 232a.2 and 232c.2, which are connected with each other via an intermediate piece 232b.1 linearly extending in z-direction, so that the conical cutout 232.2 appears stretched in z-direction and trough-like in a top view. The intermediate piece 232.2b thus forms an extension which is arranged between the two half-cones, which are defined by the cone portions 232a.2 and 232c.2.

Figures 3, 4A, 4B, 4C, 5:
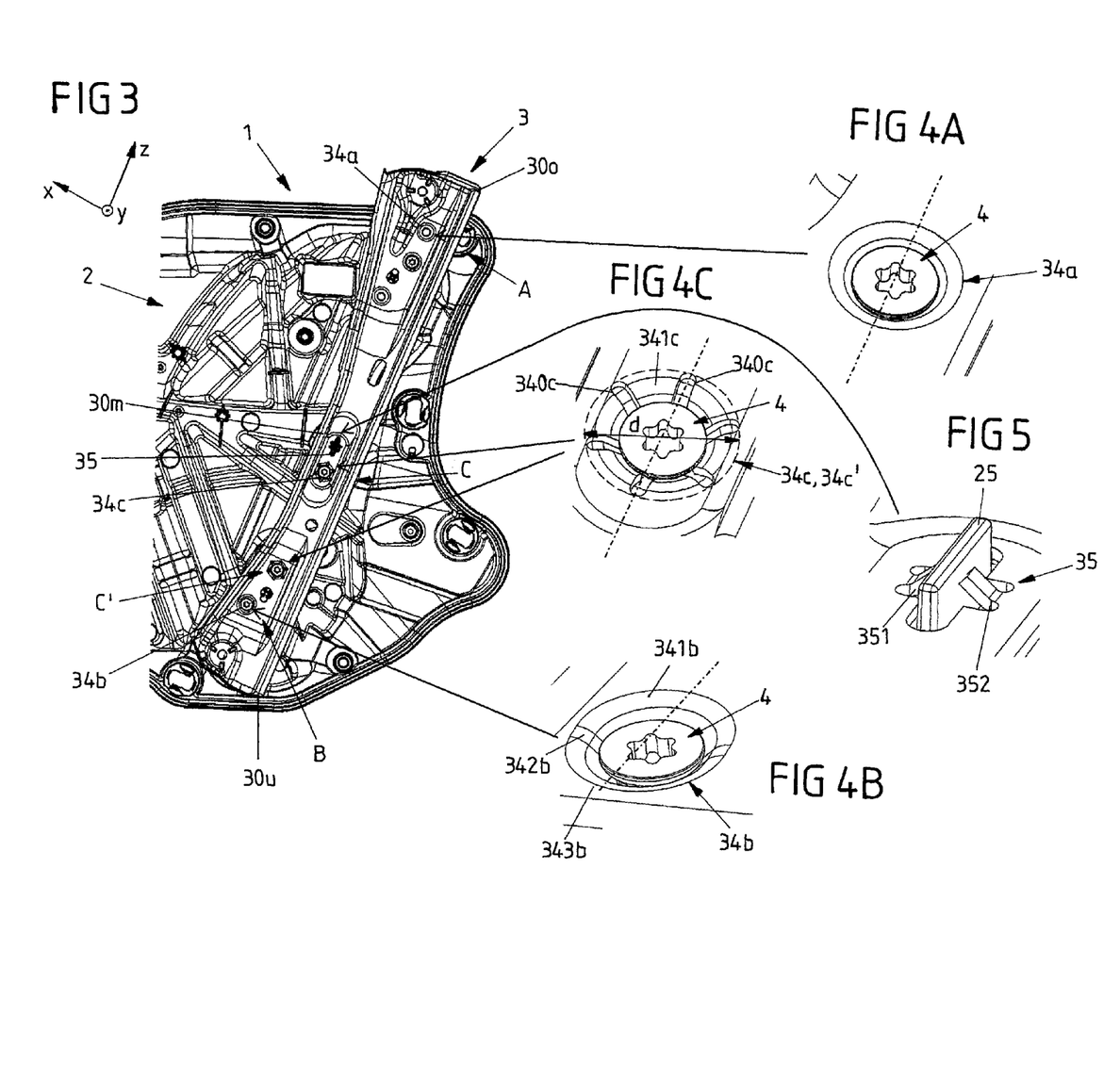

The associated conical tab of the fixing region 34b at the guide rail 3 has a similar configuration with two cone portions 341b and 343b connected via an intermediate piece 342b, i.e. is lengthened in particular in z-direction (cf. FIG. 4B). However, in particular the extension of the tab of the fixing region 34b is smaller along the z-direction, so that a tolerance compensation is possible when turning in the screw 4, and via the fixing regions 23.2 and 34b a fixation of the guide rail 3 is achieved merely in the two directions in space x and y extending vertically thereto. For this purpose, the through opening for the screw 4 at the fixing region 34b of the guide rail 3 furthermore is formed as oblong hole opening LO, which is stretched in z-direction.

At the third fixing point C and the identically formed fourth fixing point C' a fixation of the guide rail 3 is provided merely in the direction in space y. The tab of the fixing region 34c or 24c' of the guide rail 3, which is conical in the connected state, therefore is formed such that when turning in the screw 4, a tolerance compensation still is possible in x- and z-direction, cf. in particular FIGS. 4C and 9A to 9C. The fixing region 34c or 34c' therefore includes several tab-like deformation regions which are defined by deformation segments 341c. These deformation segments 341c—six in the present case—are formed by radial slots 340c in the fixing region 34c or 34c', which extend radially with respect to a through opening O for the screw 4 to be turned in.

An enveloping circle diameter d of these radial slots 340c as shown in the top view of FIG. 4C here substantially corresponds to the sum resulting from a maximum diameter of an upper edge of the conical cutout 232.3 facing the guide rail and twice a specified tolerance for the guide rail 3 in one of the directions in space x or z. A desired compensation in x- and z-direction can be achieved thereby.

Figures 8A, 9A:
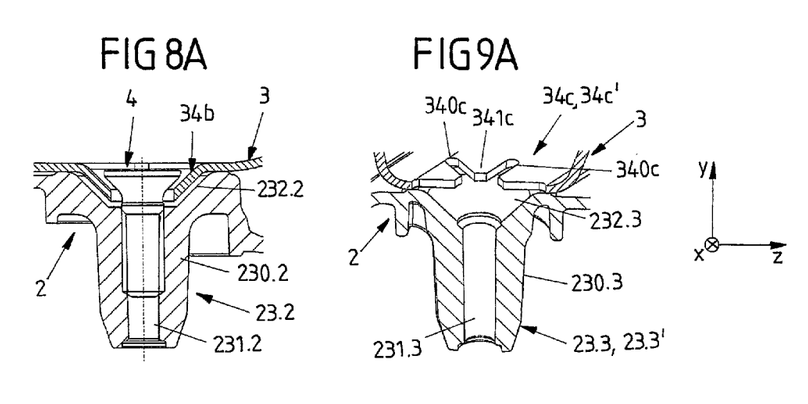
Figure 8B:
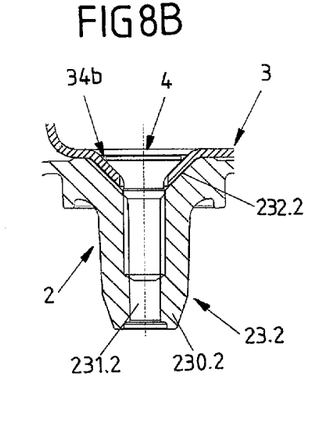
Figure 9B:
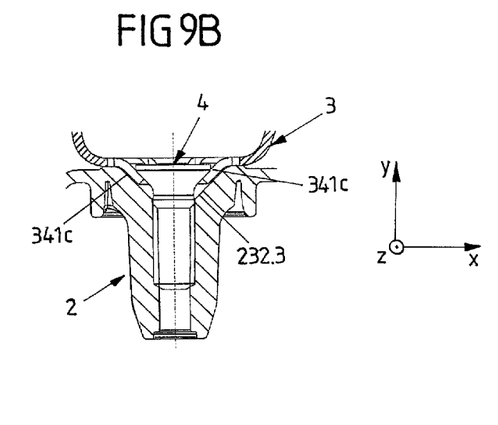
Figure 9C:
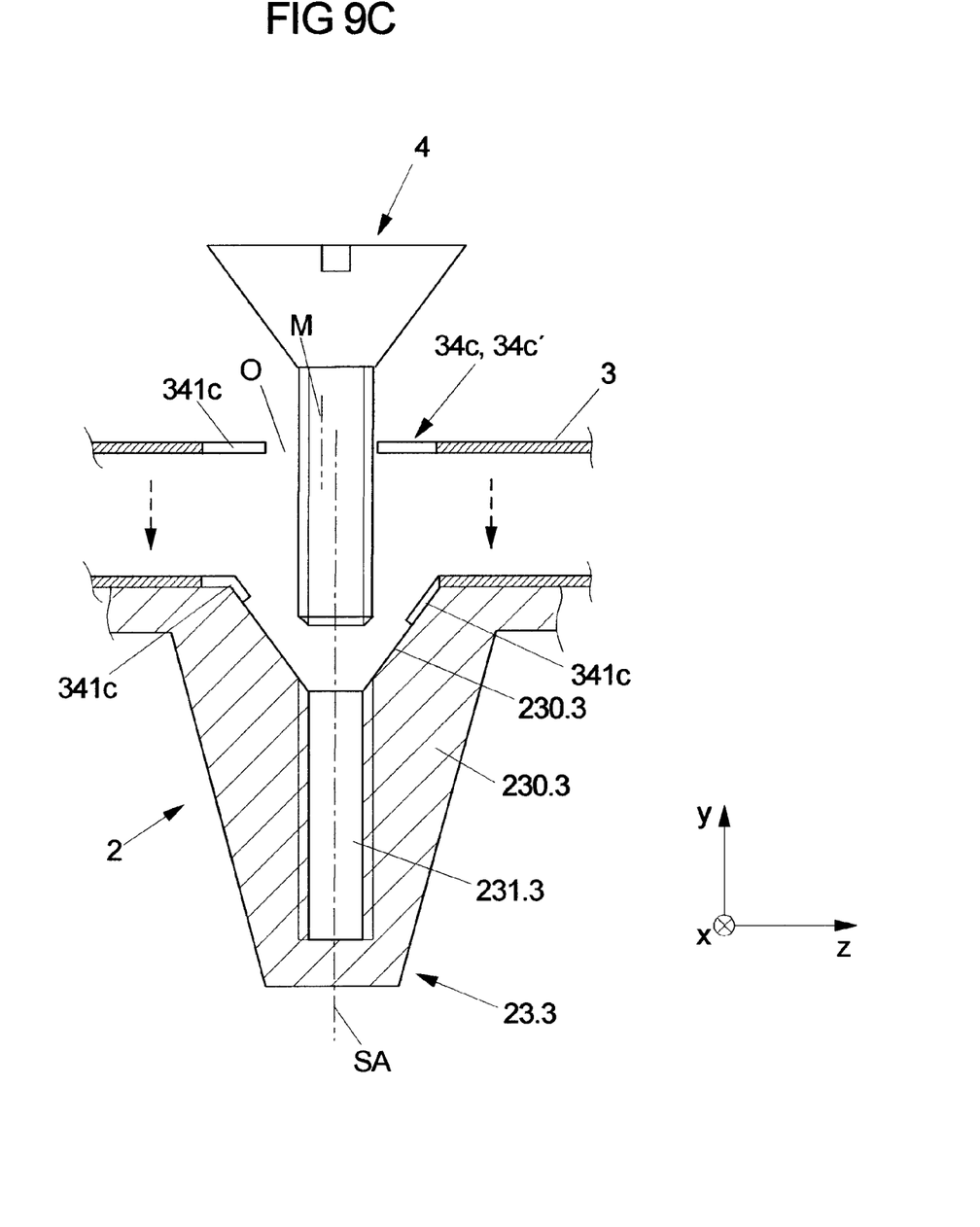

As shown in FIG. 9A, the preformed tab-like deformation segments 341c initially do not or hardly protrude in direction of the assembly carrier 2, when the screw 4 has not been turned in yet at the fixing point C or C'. The deformation segments 341c thus do not form a tab or at best form an incompletely formed tab, which in y-direction protrudes with a distinctly smaller length in direction of the assembly carrier 2 than in a connected state corresponding to the sectional representation of FIG. 9B, when the screw 4 is turned in properly. On turning in, the deformation segments 341c are bent (more strongly) by the conical screw head 40 of the screw 4 and pressed into the conical cutout 232.3 of the assembly carrier 2. A diameter of the through opening O in the guide rail 3 here is larger than the diameter of a thread portion 41 of the screw 4, which is turned into the screw channel 231.3. It thereby is achieved that a screw axis SA of the screw 4 need not necessarily coincide with a middle axis M through the center of the through opening O, when the screw A is turned in. When turning in the screw 4—as shown by way of example in the sectional representation of FIG. 9C—deformation segments 341c of the guide rail 3 thus can be bent through to a different extent. After the proper fixation of the guide rail 3, the deformation segments 341c bent over, which in the connected state hence form the conical and here slotted tab of the fixing region 34c, 34c', thus protrude into the cutout 232.3 of the associated fixing region 23.3 at the assembly carrier 2 with different lengths. Via a slotted fixing region 34c or 34c' with its tab-like and selectively deformable deformation segments 341c it thus is achieved at the fixing point C or C' that the guide rail 3 is fixed merely in y-direction via the screw 4 turned in.

As explained, due to the adapted geometries of the fixing regions 34a, 34b and 34c and optionally 34c' at the guide rail 3 it is achieved that for achieving different degrees of freedom at the different fixing points A, B and C/C' no different fixing elements must be used, but identically formed screws 4 with conical screw head 40 can be used.

Furthermore, the assembly carrier 2 and the guide rail 3 each include preassembly means 25, 35 for arranging and holding the guide rail 3 in a defined preassembly position at the assembly carrier 2, before the screws 4 are turned in. The preassembly means 25, 35 here cooperate, in order to captively hold the guide rail 3 at the assembly carrier 2 in the preassembly position via at least one positive connection. A preassembly means of the guide rail 3 is formed by a preassembly opening 35 and a preassembly means of the assembly carrier 2 is formed by an oblong preassembly web 25 protruding like a rib. In the preassembly position the preassembly web 25 positively engages into the preassembly opening 35 and is secured thereto via deformable clamping tabs 351, 352 which are provided at the edge of the preassembly opening 35. On insertion, these deformable clamping tabs 351, 352 are bent over by the preassembly web 35 and thereby non-positively and/or positively get caught therewith, so that the guide rail no longer can easily be separated from the assembly carrier 2.

With FIGS. 10, 11, 12A to 12B and 13 a further variant for a window lifter assembly 1 according to the invention is illustrated, which here is illustrated only in part with sectional views of the relevant fixing points A, B and C/C' as well as the utilized fixing element in the form of a screw 4*.

Figure 6:
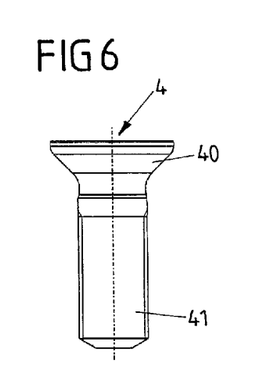
FIG. 6 shows an enlarged view of the screw used for fixing the guide rail in the exemplary embodiment of FIG. 1.
Figure 7:
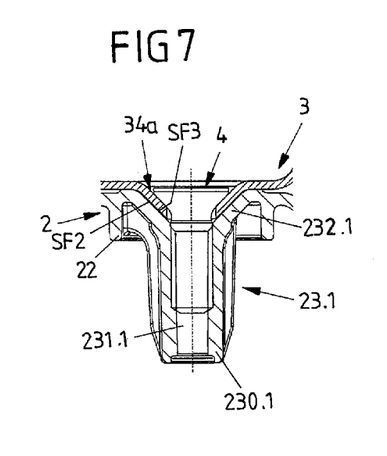
FIG. 7 shows a sectional view of the first fixing point.

Instead of the screw 4 with a conical screw head 40, which is shown in a side view in FIG. 6, a screw 4* with a frustoconical screw head 40* and trapezoidal cross-section is used in the illustrated design variant. This screw 4* is shown in the side view of FIG. 10. The screw head 40* frustoconical in cross-section defines a conically extending lateral shell surface 401* and a flat bottom side 400*. Depending on the fixing point A, B or C/C' the screw head 40* now cooperates with the guide rail 3 to be fixed via its shell surface 401* or via its bottom side 400*.

In contrast to the design variant explained above, fixing points 34a*, 34b* and 34c* here are provided at the guide rail 3, which in the connected state do not form a conical tab, but a frustoconical tab which engages into a corresponding frustoconical cutout 232.1*, 232.2* or 232.3* of an associated fixing region 23.1*, 23.2* or 23.3* of the assembly carrier 2.

Figure 11:
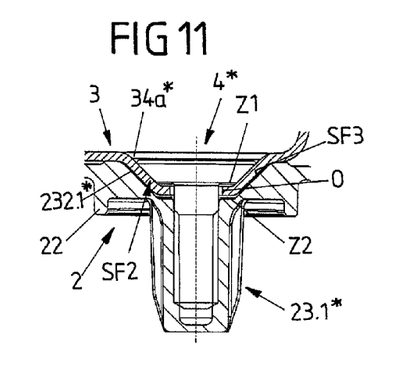
FIG. 11 shows an enlarged view of a first fixing point for a screw according to FIG. 10.

As can be taken from the sectional representation of FIG. 11, in which the fixing point A is shown with the screw 4* turned in, the screw head 40 with its shell surface 401* here presses against the conically tapered portions of the cutout 232.1* and hence presses (cone) outer surfaces or side faces SF3 of the tab of the guide rail 3 acting as clamping surfaces against (cone) inner surfaces or side faces SF2 of the cutout 232.1* of the assembly carrier 2 acting as counter clamping surfaces. The fixing regions 34a* and 23.1* as well as the screw 4* here are adjusted to each other such that with the screw 4* turned in an abutment of the conical shell surface 401* of the screw 4* against the cone inner surfaces of the guide rail tab as well as an abutment of the cone outer surfaces of the guide rail tab against the cone inner surfaces of the cutout 232.1' of the assembly carrier 2 are ensured. The bottom side 400* of the screw head 4* does not rest against the flat portion of the frustoconical tab and the flat portion of the tab also does not rest against the flat basis of the cutout 232.1* forming the edge of the opening of the screw channel 231.1. Rather, there are each provided spaces Z1 or Z2.

Figures 10, 12B:
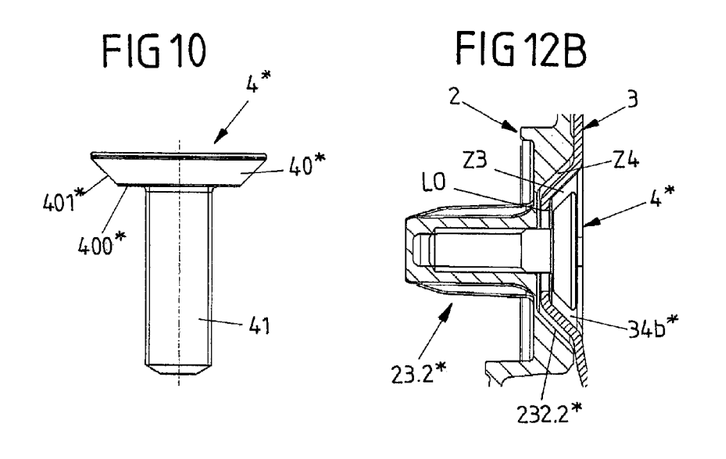
FIG. 10 shows an enlarged view of a screw with frustoconical screw head, which is used in an alternative design variant.
FIGS. 12A-12B show sectional views along different sectional planes of a second fixing point for a screw according to FIG. 10.
Figures 12A, 13:
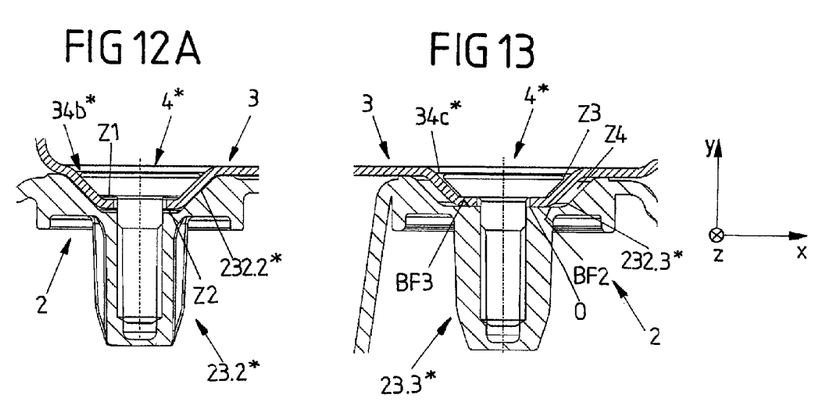
FIG. 13 shows a sectional view of a third fixing point for a screw according to FIG. 10 on an enlarged scale.

At the fixing point B on the other hand, corresponding to the two sectional representations of FIGS. 12A and 12B for the fixation of the guide rail 3 in the directions in space x and y it is provided that here the screw head 40* of the screw 4* with its conical shell surface 401* likewise (flatly) rests against the cone inner surfaces of the fixing region 430b* of the guide rail 3 along the x-direction, in order to clampingly press the cone outer surfaces of the tab of the fixing region 34b* against the cone inner surfaces of the cutout 232.2* of the assembly carrier 2. However, there is provided a clearance between the portions of the cone inner surfaces of the fixing region 34b* adjacent to the screw head 40* in z-direction. Here, a space Z3 is formed corresponding to the sectional representation of FIG. 12B. Then, a space Z4 likewise is present between the portions of the cone outer surface of the tab and the cone inner surfaces of the cutout 232.2*. Furthermore, the screw 4* at the second fixing region 34b* of the guide rail 3 again is guided through an oblong hole opening LO. In this way, a tolerance compensation is ensured in z-direction, but in this configuration the guide rail 3 at the same time is fixed at the assembly carrier 2 at the second fixing point B in x- and y-direction.

At the third fixing point C/C', at which a fixation of the guide rail 3 is effected merely in y-direction, the screw head 40* of the screw 4* again acts on the fixing region 34c* only via its bottom side 400*, in order to press an outer flat base surface BF3 of the tab acting as clamping surface against a flat base surface BF2 of the cutout 232.3*. Between the conical shell surface 401* of the screw head 40* and the cone inner surfaces of the tab a clearance again is provided via a space Z3. Between the cone outer surfaces of the tab and the cone inner surfaces of the cutout 232.3* a clearance likewise is provided via a further space Z4. Via the fixing point C/C' defined therewith a tolerance compensation in x- and y-direction hence is possible.

The invention claimed is:

1. A window lifter assembly comprising a carrier component and a guide rail fixed to the carrier component, the window lifter assembly defining a path of adjustment for a window pane to be adjusted:
  wherein the guide rail is connected with the carrier component at at least three fixing points via at least three fixing elements, wherein one of the fixing elements is located at each of the at least three fixing points,
  wherein each of the at least three fixing points is defined by a carrier component fixing region with a conical cutout or a frustoconical cutout, with which a conical tab or a frustoconical tab, respectively, of one of a first, second, and third guide rail fixing region engages,
  wherein each tab includes a through opening configured to accommodate one of the at least three fixing elements,
  wherein each of the at least three fixing elements extends through the through opening of one of the tabs and presses a tab clamping surface toward a cutout clamping surface in order to fix the guide rail to the carrier component, and
  wherein each of the guide rail fixing regions is one of three different geometric designs, each of which engages with a respective one of the tabs into the cutout of a respective one of the carrier component fixing regions, wherein three identical screws are used, one at each of the at least three fixing points, in order to fix the guide rail to the carrier component, and due to the different geometric designs of guide rail fixing regions, one of the screws fixes the guide rail to the carrier component at a first fixing point along three axes all extending perpendicular to each other, at a second fixing point only along two of the three axes, and at a third fixing point only along one of the three axes.

2. The window lifter assembly according to claim 1, wherein the third fixing point is provided between the first and second fixing point along a longitudinal extension of the guide rail.

3. The window lifter assembly according to claim 2, wherein the third fixing point is provided approximately centrally between the first and second fixing point.

4. The window lifter assembly according to claim 1, wherein the third guide rail fixing region defining the third fixing point is formed such that before one of the fixing elements is accommodated in the third guide rail fixing region, the third guide rail fixing region is absent a conical tab or frustoconical tab, or forms an incomplete conical tab or frustoconical tab which only partially extends in a direction of the cutout of the carrier component with which the conical or frustoconical tab engages after the screw is accommodated therein.

5. The window lifter assembly according to claim 4, wherein the third fixing region forms at least one deformation region at an edge of the through opening of the third fixing region, which at least one deformation region is deformable by attaching the screw.

6. The window lifter assembly according to claim 5, wherein the at least one deformation region is defined by at least two spaced slots in the third guide rail fixing region, wherein the at least two spaced slots extend substantially radially with respect to a screw axis of the screw accommodated in the through opening of the third guide rail fixing region.

7. The window lifter assembly according to claim 6, wherein the edge of the through opening is divided into several segments of substantially equal size by the at least two spaced slots each extending substantially radially to the screw axis, wherein each segment defines a deformation region.

8. The window lifter assembly according to claim 7, wherein an enveloping circle diameter of the at least two spaced slots around the screw axis at least corresponds to a sum resulting from a maximum diameter of an upper edge of the conical or frustoconical cutout facing the guide rail at one of the carrier component fixing regions associated with the respective conical or frustoconical cutout and twice a specified tolerance value for the guide rail in a spatial direction along which the guide rail is not fixed at the third guide rail fixing point with respect to the carrier component.

9. The window lifter assembly according to claim 5, wherein several deformation regions are formed in the third guide rail fixing region.

10. The window lifter assembly according to claim 1, wherein the second guide rail fixing region defining the second fixing point includes an oblong-hole-shaped through opening.

11. The window lifter assembly according to claim 1, wherein one of the carrier component fixing regions, which defines the second fixing point, defines a conical or frustoconical cutout which is designed oblong in a direction transverse to the screw axis.

12. The window lifter assembly according to claim 1, wherein at least one fourth fixing point is provided and defined by another guide rail fixing region and which geometrically substantially corresponds to a geometry of the third guide rail fixing region.

13. The window lifter assembly according to claim 1, wherein the carrier component fixing regions defining the first and third fixing points are formed geometrically substantially identical.

14. The window lifter assembly according to claim 1, wherein each of the screws has a frustoconical screw head with a trapezoidal cross-section.

15. The window lifter assembly according to claim 14, wherein the cutouts of the first and second fixing regions provided at the carrier component defining the first and second fixing points and the tabs of the first and second fixing regions provided at the guide rail engaging therein are each frustoconical, so that two flat clamping surfaces of a frustoconical cutout and of a frustoconical tab of the first or second fixing regions, which are arranged one above the other, each face a flat bottom side of the frustoconical screw head and a clearance is present between the flat bottom side of the screw head and the clamping surface of the guide rail.

16. The window lifter assembly according to claim 14, wherein the cutout of the third carrier component fixing region defining the third fixing point is frustoconical, so that a flat clamping surface of the cutout of the third carrier component fixing region faces a flat bottom side of the frustoconical screw head and the screw with the flat bottom side of its frustoconical screw head clamps a portion of the frustoconical tab of the guide rail against the flat clamping surface of the carrier component at the third fixing point.

17. The window lifter assembly according to claim 14, wherein the cutouts of the carrier component fixing regions defining the first and second fixing points and the tabs of the first and second guide rail fixing regions respectively engaging the carrier component fixing regions are each frustoconical so that at both the first and second fixing points, a flat clamping surface of a frustoconical cutout and of a frustoconical tab of the respective fixing regions, which are arranged one above the other, each face a flat bottom side of the frustoconical screw head and a clearance is present between the clamping surfaces of the carrier component and of the guide rail.

18. The window lifter assembly according to claim 1, wherein the carrier component and the guide rail each include a preassembly structure in order to arrange the guide rail on the carrier component in a preassembly position via at least one positive connection before attaching any of the screws.

19. The window lifter assembly according to claim 18, wherein the preassembly structure of the guide rail comprises a preassembly opening and the preassembly structure of the carrier component comprises a protruding preassembly web which, in the preassembly position, positively engages into the preassembly opening.

20. A method for mounting a window lifter assembly according to claim 1, the method comprising fixing the guide rail to the carrier component via the screws, wherein fixing the guide rail comprises:

attaching a first one of the screws at the first fixing point such that the guide rail and the carrier component are fixed along the three axes, thereafter attaching a second one of the screws such that the guide rail and the carrier component are fixed along two of the three axes, and thereafter attaching a third one of the screws at the third fixing point such that the guide rail and the carrier component are fixed along one of the three axes.

* * * * *